United States Patent Office 3,448,159
Patented June 3, 1969

3,448,159
ETHYL VINYL SULFONE PRODUCTION
Harvey S. Klein, Berkeley, Calif., assignor to Shell Oil Company, New York, N.Y., a corporation of Delaware
No Drawing. Filed Mar. 23, 1967, Ser. No. 625,325
Int. Cl. C07c 151/00
U.S. Cl. 260—607       8 Claims

ABSTRACT OF THE DISCLOSURE

Ethyl vinyl sulfone is produced as a major product by the reaction of ethylene and sulfur dioxide in aqueous solution in the presence of a palladium halide catalyst and an added inorganic halide compound co-catalyst.

PRIOR ART

The reaction of sulfur dioxide with olefinic hydrocarbons to produce unsaturated sulfone products is known in the art. For example, the applicant's copending U.S. application, Ser. No. 496,668, filed Oct. 15, 1965 now U.S. Patent 3,397,242, discloses that the contacting of ethylene and sulfur dioxide in an inert organic solvent in the presence of a palladium halide catalyst results in the efficient production of ethyl 2-butenyl sulfone in high selectivity. Any ethyl vinyl sulfone thereby produced is observed as a minor product only.

THE INVENTION

It has been found that ethyl vinyl sulfone can be produced as the major product and in many instances as an exclusive product by the process of contacting ethylene and sulfur dioxide in aqueous solution in the presence of palladium halide catalyst and an added soluble halide compound as co-catalyst.

THE CATALYST

The palladium halide catalyst

The palladium halide catalyst employed in the process is a compound of the formula $PdX_2$ wherein X is halogen. Although palladium halides wherein the halogen is fluorine or iodine are in general operable better results are obtained when the catalyst is a palladium halide of halogen of atomic number from 17 to 35 inclusive, that is, the middle halogens, chlorine and bromine. Particularly preferred as catalyst is palladium chloride, $PdCl_2$.

The palladium halide is employed in catalytic quantities. Molar ratios of palladium halide to the limiting reactant, i.e., whichever of the sulfur dioxide or ethylene reactants is present in the lesser number of equivalents, of from about 1:5 to about 1:50 are satisfactory, with molar ratios of from about 1:7 to about 1:20 being preferred.

The Co-Catalyst

The selectivity to ethyl vinyl sulfone observed in the process of the invention depends in part upon the use of an excess of added halide ion as co-catalyst in conjunction with the palladium halide catalyst in an amount sufficient to provide at least about 6 moles of excess added halide ion co-catalyst per mole of palladium halide. In general, added halide ion concentrations as high as about 50 moles per mole of palladium halide are satisfactory, although added halide ion concentrations from about 6 moles to about 30 moles per mole of palladium halide are preferred.

The halide ion co-catalyst employed in the process of the invention may be obtained from any inorganic halogen compound which is soluble in the reaction medium and does not undergo undesirable side reactions with the reactants and products produced therefrom. Although halogen compounds wherein the halide is fluoride or iodide are in part operable, the preferred halogen compounds are those wherein the halogen is halogen of atomic number from 17 to 35 inclusive, particularly chlorine.

Suitably employed halogen compounds are the ionic or salt-like halides, the polarized covalent halides, and mixtures thereof. Although there is no sharp line of demarcation between the ionic or salt-like halides and the polarized covalent halides, the term "ionic or salt-like" as employed herein is meant to describe those halides that exist in the solid state as ionic or semi-ionic crystals. The ammonium halides are one group of ionic halides derived from non-metals that are suitably employed in the process of the invention. Most ionic or salt-like halides, however, are derived from active metals. Illustrative of ionic or semi-ionic metal halides are alkali metal halides such as lithium chloride, lithium bromide, sodium chloride, sodium bromide, potassium chloride, potassium bromide, rubidium chloride and rubidium bromide, and alkaline earth metal halides such as magnesium chloride, magnesium bromide, calcium chloride, calcium bromide, strontium chloride and strontium bromide. Particularly preferred for use in the process of the invention are the alkali metal halides, especially potassium chloride.

By the term "polarized covalent halides" is meant those compounds of halogen which normally exist in the molecular state as discreet covalent or semi-covalent molecules and are derived from non-metals or metals with a relatively low electronegativity. Halogen halides are one group of covalent halides derived from non-metals and particularly preferred for the process of the invention is the hydrogen halide wherein the halide is chloride. Transition metal halides are also suitable as the source of added ion co-catalyst. Illustrative of suitably employed co-catalysts are transition metal halides of transition metals of atomic number from 24 to 29 inclusive, e.g., chromium, manganese, iron, cobalt, nickel, and copper. Although it is not known with certainty what role the transition metal cations are serving in the process of the invention, it has been found that a halide ion co-catalyst system which embodies certain combinations of multivalent transition metals are especially effective in affording a high selectivity to ethyl vinyl sulfone. Particularly preferred for use in the process of the invention are cupric chloride or ferric chloride, or mixtures thereof.

THE SOLVENT

The process of the invention is conducted in liquid phase solution wherein the solvent essentially comprises water. The observed selectivity of the process is to an extent dependent on the ability of the water to solubilize the reactants as well as the inorganic catalyst used in the process. However, without wishing to be bound by any particular theory, it is believed that water also participates as a reactive species in the reaction process. As an example, the production of the diethyl sulfone occasionally observed as a by-product requires a hydride or hydrogen source for its formation and water appears to be the most likely source of the hydride or hydrogen. In any event, the use of water in conjunction with added halide ion in the reaction of ethylene and sulfur dioxide results in the formation of ethyl vinyl sulfone as the major product, whereas the predominant product is ethyl 2-butenyl sulfone when inert organic solvents are used.

The water is employed in the process of the invention as a single solvent or is employed as a mixture with minor amounts of miscible liquid diluents such as highly polar, aprotic organic solvents. Although the presence of such inert diluents does not appear to have any detrimental effect, nether does it appear to have any substantial benefit, and in the preferred modifications of the process of the invention, the solvent consists essentially of water.

The amount of water solvent to be employed in the process of the invention is not critical so long as it is sufficient to maintain the catalyst components and at least a portion of the reactants in solution. Molar ratios of water to total reactants of from about 1:1 to about 20:1 are satisfactory.

THE REACTANTS

No special precautions are required with regard to the ethylene and sulfur dioxide reactants, and commercially available grades of these materials are suitably employed. The ratio of sulfur dioxide to ethylene is not critical, although it is generally desirable to employ a molar amount of ethylene that is at least stoichiometric, i.e., at least 2 moles of ethylene per mole sulfur doxide. Molar ratios of ethylene to sulfur dioxide of from about 3:1 to about 16:1 are satisfactory with ratios of from about 4:1 to about 8:1 being preferred.

THE REACTION CONDITIONS

The method of reactant contacting may be varied. In one modification of the process of the invention, the entire amounts of reactants, catalyst and solvent are charged to an autoclave or similar reactor wherein the mixture is maintained at reaction conditions until reaction is complete. In an alternate modification one reactant is added to the remaining reaction mixture components in increments, preferably as by adding ethylene to the other reaction mixture components. In yet another modification, reaction is effected in a continuous operation as by contacting the reactants and catalyst during passage through a tubular reactor. In any modification, the reaction is conducted at elevated temperature and pressure. Suitable reaction temperatures vary from about 40° C. to about 120° C. with the temperature range from about 50° C. to about 100° C. being preferred. The optimum reaction pressure will be somewhat dependent upon the particular reaction temperature employed, as the reactants are normally gaseous at reaction temperature. Typical reaction pressures vary from about 100 p.s.i.g. to about 1000 p.s.i.g. although reaction pressures from about 300 p.s.i.g. to about 900 p.s.i.g. are preferred. Subsequent to reaction, the reaction mixture is separated and the desired sulfone product is recovered by conventional methods such as fractional distillation, selective extraction, fractional crystallization or the like.

UTILITY

The ethyl vinyl sulfone product of the invention is useful because of the reactive character of the vinyl group which has found many applications as the reactive site in the preparation of other useful organic compounds. Ethyl vinyl sulfone is polymerizable alone or with other unsaturated compounds such as styrene, acrylic acid methyl esters, methacrylic acid methyl esters, acrylic acid diisobutylamide, butadiene, and acrylonitrile as disclosed in I.G. Farbenindustrie—U.S. Publication Board Reprint No. 44655 or U.S. Patent No. 2,472,672 of Mighton et al. issued June 7, 1949, Ethyl vinyl sulfone is also converted into polymers and copolymers by processes similar to those described in U.S. Patent No. 2,478,378 of Dickey issued Aug. 9, 1949, U.S. Patent No. 2,538,100 of Irany et al. issued Jan. 16, 1959, and German Patent No. 937,616 of Starck et al. issued Jan. 13, 1956.

Ethyl vinyl sulfone is converted by treatment with hypochlorous acid, acylation with acetic anhydride, and dehydrohalogenation to acetoxyvinyl ethyl sulfone, which polymers to give a clear, hard, readily moldable polymer, or co-polymerizes with acrylonitrile to give polymers which can be spun into tough fibers of high tensile strength as disclosed by U.S. Patent No. 2,507,147 of Dickey et al. issued May 9, 1950. Ethyl vinyl sulfone also finds utility as a cross-linking agent for the treatment of cellulose fibers resulting in modified polymers as disclosed in Textile Res. J., 33, No. 2, 93 (1963) or U.S. Patent No. 2,539,704 of Schoene et al. issued Jan. 30, 1951.

To further illustrate the improved process of the invention, the following examples are provided. It should be understood that the details thereof are not to be regarded as limitations, as they may be varied as will be understood by one skilled in this art.

EXAMPLE I

A. A glass-lined autoclave was charged with 16 g. of ethylene, 5 g. of sulfur dioxide, 1 g. of palladium chloride, 5 g. of cupric chloride and 20 ml. of water, and the mixture was maintained for 16 hours at a temperature of 70° C. and a maximum pressure of 875 p.s.i. Gas chromatographic analysis of the total product, 2.5 g., showed that it contained approximately 45% ethyl vinyl sulfone. The identity of the product was confirmed by the conventional methods such as infrared and nuclear magnetic resonance spectra and mass spectrometric analysis.

B. To illustrate the advantage obtained when aqueous solution of halide compounds are employed in the process of the invention, a comparative experiment was conducted using an inert organic solvent in place of the water of the above experiment. By a procedure similar to that of Example IA, a mixture of 16 g. of ethylene, 6 g. of sulfur dioxide, 0.5 g. of palladium chloride and 20 ml. of benzene was maintained for 16 hours at a temperature of 70° C. Gas chromatographic analysis and separation of the product, 2.5 g., showed that it contained approximately 5% ethyl vinyl sulfone.

C. To illustrate the advantage of a halide ion co-catalyst, the following experiment was conducted in the absence of added halide ion. By the procedure of the above experiment, a mixture of 16 g. of ethylene, 6 g. of sulfur dioxide, 1 g. of palladium chloride and 20 ml. of water was charged to an autoclave. The autoclave was maintained at 70° C. for 12 hours and then at 85° C. for an additional 72 hours. Gas chromatographic analysis and separation showed that the product, 2.4 g., contained 7% ethyl vinyl sulfone.

EXAMPLE II

By a prcoedure similar to that of Example I, part A, a mixture of 16 g. of ethylene, 6 g. of sulfur dioxide, 1 g. of palladium chloride and 20 ml. of 2.4 N hydrochloric acid was maintained for 60 hours at a temperature of 70° C. and a maximum pressure of 740 p.s.i. The product mixture, 1 g., contained approximately 85% ethyl vinyl sulfone.

EXAMPLE III

By a procedure similar to that of Example I, part A, a mixture of 19 g. ethylene, 10 g. of sulfur dioxide, 1 g. of palladium chloride, 7 g. of potassium chloride, and 20 ml. of water was maintained at a temperature of 75° C. for 48 hours. The product mixture, 1 g., was composed of approximately 48% ethyl vinyl sulfone.

EXAMPLE IV

By a procedure similar to that of Example I, part A, a mixture of 21 g. of ethylene, 3 g. of sulfur dioxide, 0.35 g. of palladium chloride, 1.3 g. of palladium chloride, 1.3 g. of ferric chloride, 1.8 g. of cupric chloride, 3.2 g. of cupric acetate, 0.3 ml. of 12 N hydrochloric acid and 20 ml. of water was maintained for 2 weeks at a temperature of 70° C. The product, 2 g., was exclusively ethyl vinyl sulfone.

I claim as my invention:
1. The process of producing ethyl vinyl sulfone by contacting ethylene and sulfur dioxide in the presence of a palladium halide catalyst and an inorganic halide compound co-catalysts where the halide is of atomic number 17 to 35 inclusive, wherein the molar ratio of the added halide co-catalyst to palladium halide catalyst is at least 6:1, in aqueous solution, at a temperature of from 40° C. to about 120° C., and a pressure of from 100 p.si. to about 1000 p.s.i.

2. The process of claim 1 wherein ethylene and sulfur dioxide is contacted in a molar ratio of from about 3 moles to 16 moles of ethylene per mole of sulfur dioxide, in the presence of from about 0.02 mole to about 0.2 mole per mole of said sulfur dioxide of a palladium halide catalyst wherein the halide is halogen of atomic number from 17 to 35 inclusive and an inorganic halide compound co-catalyst wherein the halide is halogen atomic number from 17 to 35 inclusive, at a temperature of from 40° C. to about 120° C., and a pressure of from 100 p.s.i. to about 1000 p.s.i.

3. The process of claim 2 wherein the palladium halide catalyst is palladium chloride, the inorganic halide compound is selected from the group consisting of transition metal halides wherein the metal is of atomic number from 24 to 29 inclusive, alkyl metal halides, hydrogen halides, and mixtures thereof, and the molar ratio of said inorganic halide compound to palladium chloride is from about 6:1 to 30:1 inclusive.

4. The process of claim 2 wherein alkali metal halide is potassium chloride.

5. The process of claim 2 wherein the hydrogen halide is hydrogen chloride.

6. The process of claim 2 wherein the transition halide is cupric chloride.

7. The process of claim 2 wherein the transition metal halide is ferric chloride.

8. The process of claim 2 wherein the transition metal halide is a mixture of cupric chloride and ferric chloride.

References Cited
UNITED STATES PATENTS

| 3,397,242 | 8/1968 | Klein | 260—607 |
|---|---|---|---|
| 3,333,006 | 7/1967 | Sharf et al. | 260—607 |

CHARLES B. PARKER, *Primary Examiner.*

D. R. PHILLIPS, *Assistant Examiner.*